US010393074B2

(12) United States Patent
Schmid et al.

(10) Patent No.: US 10,393,074 B2
(45) Date of Patent: Aug. 27, 2019

(54) FILTER ELEMENT AND METHOD FOR PRODUCING SAME

(71) Applicant: MANN+HUMMEL GMBH, Ludwigsburg (DE)

(72) Inventors: Daniel Schmid, Sachsenheim (DE); Michael Maier, Reisbach (DE); Fabian Wagner, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 76 days.

(21) Appl. No.: 14/818,365

(22) Filed: Aug. 5, 2015

(65) Prior Publication Data

US 2016/0040633 A1 Feb. 11, 2016

(30) Foreign Application Priority Data

Aug. 5, 2014 (DE) ........................ 10 2014 011 393

(51) Int. Cl.

| | |
|---|---|
| ***F02M 35/024*** | (2006.01) |
| ***B01D 46/52*** | (2006.01) |
| ***B01D 46/00*** | (2006.01) |
| ***B29C 44/12*** | (2006.01) |
| ***B01D 46/10*** | (2006.01) |
| *B29K 21/00* | (2006.01) |
| *B29K 105/04* | (2006.01) |
| *B29L 31/14* | (2006.01) |
| *B29K 623/00* | (2006.01) |

(Continued)

(52) U.S. Cl.

CPC ... *F02M 35/02408* (2013.01); *B01D 46/0001* (2013.01); *B01D 46/0005* (2013.01); *B01D 46/10* (2013.01); *B01D 46/521* (2013.01); *B29C 44/1271* (2013.01); *F02M 35/0245* (2013.01); *F02M 35/02491* (2013.01); *B01D 2271/022* (2013.01); *B01D 2271/025* (2013.01); *B29K 2021/003* (2013.01); *B29K 2101/12* (2013.01); *B29K 2105/04* (2013.01); *B29K 2623/12* (2013.01); *B29K 2677/00* (2013.01); *B29L 2031/14* (2013.01)

(58) Field of Classification Search

CPC ............ B01D 46/0002; B01D 46/0005; B01D 46/10; B01D 46/521; B01D 2271/022; F02M 35/02408; F02M 35/0245; F02M 35/02491

See application file for complete search history.

(56) References Cited

U.S. PATENT DOCUMENTS 6,045,600 A * 4/2000 Michaelis ............ B01D 29/012 55/497
6,221,122 B1 * 4/2001 Gieseke ............ B01D 46/0005 55/385.3

(Continued)

FOREIGN PATENT DOCUMENTS

EP 1464372 B1 1/2009

*Primary Examiner* — Robert Clemente
(74) *Attorney, Agent, or Firm* — James Hasselbeck

(57) ABSTRACT

A filter element, in particular for filtering the intake air of an internal combustion engine, is provided with a filter medium and a sealing device extending at least partially circumferentially around the filter medium, wherein the sealing device is made from a foamed thermoplastic elastomer, and wherein the sealing device is injection molded using a plastics injection molding method.

8 Claims, 2 Drawing Sheets

(51) Int. Cl.
*B29K 101/12* (2006.01)
*B29K 677/00* (2006.01)

(56) References Cited

U.S. PATENT DOCUMENTS

| | | | | |
|---|---|---|---|---|
| 8,919,045 | B2 * | 12/2014 | Bellmore | B29C 53/48 277/644 |
| 2004/0194441 | A1 * | 10/2004 | Kirsch | B01D 29/07 55/497 |
| 2005/0193695 | A1 * | 9/2005 | Holmes | B01D 46/0002 55/482 |
| 2007/0089386 | A1 | 4/2007 | Walz | |
| 2009/0291608 | A1 * | 11/2009 | Choi | H05K 9/0015 442/394 |
| 2009/0301046 | A1 * | 12/2009 | Felber | B01D 46/0005 55/502 |
| 2010/0229513 | A1 * | 9/2010 | Eisengraeber-Pabst | B01D 46/10 55/385.3 |
| 2012/0238198 | A1 | 9/2012 | Rabanter | |
| 2012/0324848 | A1 * | 12/2012 | Enbom | B01D 46/0001 55/483 |
| 2014/0174046 | A1 * | 6/2014 | Yoshino | B01D 46/0005 55/499 |

* cited by examiner

FILTER ELEMENT AND METHOD FOR PRODUCING SAME

BACKGROUND OF THE INVENTION

The present invention relates to a filter element, in particular for filtering air for an internal combustion engine, and to a method for producing such a filter element.

Although applicable to any filter element and filter arrangement, the present invention and its underlying problem are described hereinafter in connection with an engine intake air filter or air filter of a motor vehicle.

For filtering air for an internal combustion engine of a motor vehicle, folded or pleated filter materials such as filter fleeces forming a fold pack are commonly used. For this purpose, first an initially flat filter material sheet is folded in a zigzag-shaped manner. The fold pack is held in a frame, for example. Such filter elements can be fixed interchangeably in a filter receptacle.

EP 1 464 372 B1 describes a filter element having a flexible seal that is injection-molded onto the filter element by a plastics injection molding method.

SUMMARY OF THE INVENTION

Against this background, it is an object of the present invention to provide an improved filter element.

The filter element comprises a filter medium and a sealing device extending at least partially around the filter element, wherein the sealing device is made from a foamed thermoplastic elastomer, and wherein the sealing device is injection-molded using a plastics injection molding method.

The filter element is in particular an air filter for cleaning intake air for an internal combustion engine in a motor vehicle.

Due to the fact that the foamed sealing device is injection-molded by a plastics injection molding method onto the filter medium and/or onto a stabilizing element holding the filter medium, such as a frame, the filter element can be produced cost-effectively in high volumes. Due to the fact that the sealing device is made from a foamed plastic material, it is very flexible and compressible. This results in a good sealing effect.

In particular, the sealing device projects laterally from the filter medium. This means the sealing device is preferably arranged substantially perpendicularly to the flow direction through the filter element. In particular, the sealing device is arranged such that it is compressible in the axial direction of the filter element. In the present case, "axial direction" is to be understood as a direction oriented parallel to the flow direction through the filter element. The filter element can be received in a filter housing or in a filter receptacle. The sealing device can be preferably compressed or pressed in the flow direction in the filter housing.

In embodiments, the filter element further has a frame that extends at least partially around the filter medium, wherein the sealing device is injection-molded directly onto the frame. The frame can be injection-molded directly onto the filter medium. For example, the frame can be made from a polyamide or an ABS material (acrylonitrile butadiene styrene), in particular a glass fiber-reinforced material.

In further embodiments, the frame is made from polypropylene and the sealing device is made from a foamed olefin-based thermoplastic elastomer (thermoplastic olefin: TPO) or a cross-linked olefin-based thermoplastic elastomer (thermoplastic vulcanizate: TPV). This results in particularly good adhesion between the frame and the sealing device.

In further embodiments, the frame is made from polyamide and the sealing device is made from a foamed styrene block copolymer (TPS) or a thermoplastic copolyamide (TPA). This results in a particularly good adhesion between the frame and the sealing device.

In further embodiments, the sealing device is injection-molded onto a web protruding out of the frame. The sealing device preferably embeds the web at least partially.

In further embodiments, the sealing device is compressible. The sealing device has pores, bubbles and/or cavities. The pores can be closed or connected to one another. When compressing the sealing device, the pores are compressed. The sealing device can have a rectangular or a rhombic cross-section.

In further embodiments, the thermoplastic elastomer is foamed by means of microspheres of a chemical and/or physical foaming method that are admixed to the thermoplastic elastomer. The microspheres can be adapted to expand under the influence of heat. For example, for purely physical foaming of the thermoplastic elastomer, supercritical nitrogen can be fed into the plastic melt. The foaming agent can act purely chemically, physically or chemically and physically. EXPANCEL® is an example of a combined physical and chemical foaming agent.

In further embodiments, the sealing device has a rectangular or rhombic cross-section. The sealing device is preferably compactable or compressible in a direction oriented perpendicular to the web of the frame.

In further embodiments, the thermoplastic elastomer (TPE) is an olefin-based thermoplastic elastomer (TPO or TPE-O), a cross-linked olefin-based thermoplastic elastomer (TPV or TPE-V), a urethane-based thermoplastic elastomer (TPU or TPE-U), a thermoplastic polyester elastomer or a thermoplastic copolyester (TPC or TPE-E), a styrene block copolymer (TPS or TPE-S) or a thermoplastic copolyamide (TPA or TPE-A). Particularly preferably, the thermoplastic elastomer is a TPO, a TPV, a TPS or a TPA.

Furthermore, proposed is a method for producing a filter element, in particular an air filter, for a motor vehicle, wherein the filter element has a filter medium and a sealing device extending at least partially around the filter medium, the sealing device being made from a foamed thermoplastic elastomer, wherein the sealing device is injection-molded onto the filter medium using a plastics injection molding method.

In embodiments, a frame is injection-molded onto a filter medium. The frame can be made from an ABS material or polyamide that is in particular fiber reinforced, for example. The frame can extend entirely around the filter element.

In further embodiments, the sealing device is injection-molded onto the frame. In particular, the sealing device is injection-molded onto a web provided on the frame.

In further embodiments, the frame and the sealing device are injection-molded onto the filter medium in the same injection mold. In this way, the filter element can be produced cost-effectively and in high volumes.

The filter medium can be folded or corrugated. Known foldings are zigzag- or W-foldings, for example. The filter medium can be embossed and subsequently sharply folded at embossed edges thereby forming folded edges. A flat filter material sheet can be used as starting material and formed correspondingly. For example, the filter medium is a filter fabric, a filter mesh or a filter fleece. In particular, the filter medium can be produced by spunbonding or meltblown methods. Furthermore, the filter medium can be felted or needled. The filter medium can comprise natural fibers such as cellulose or cotton, or synthetic fibers, for example made of polyester, polyvinyl sulfate or polytetrafluoroethylene. During processing, the fibers can be oriented in the machine direction or oriented diagonal and/or transverse thereto.

A corresponding filter element serves for filtering fluids, i.e., gaseous and/or liquid media, for example air. A gaseous medium or air also encompasses herein mixtures of gas or air with solids and/or mixtures of gas or air with liquids. The filter element is in particular an intake air filter.

The filter element can have a seal which seals a raw side associated with the filter element with respect to a clean side thereof. The sealing device can be designed to be identical in terms of components with one or more stabilizing elements of the filter element. The filter element can be fixed interchangeably in the filter receptacle.

The filter element can be used in passenger cars, trucks, construction machines, watercraft, rail vehicles, aircraft, and generally in air conditioning technology, in particular in heating and air conditioning units, household appliances, fuel cells or in building technology. These motorized vehicles or vehicles can be operated electrically and/or by means of fuel (in particular, gasoline or diesel). With regard to building technology, in particular stationary installations for air treatment can be taken into consideration.

Further possible implementations of the invention also comprise combinations of features or method steps previously described or described below with respect to the exemplary embodiments, which combinations are not explicitly mentioned. A person skilled in the art will also be able to add individual aspects as improvements or supplements to the respective basic version of the invention.

Further configurations of the invention are subject matter of the dependent claims and the exemplary embodiments described below. Furthermore, the invention will be explained in greater detail by means of exemplary embodiments with reference to the attached figures.

BRIEF DESCRIPTION OF THE DRAWINGS

Unless otherwise indicated, identical or functionally identical elements are designated by the same reference numbers.

DESCRIPTION OF PREFERRED EMBODIMENTS

Figure 1:
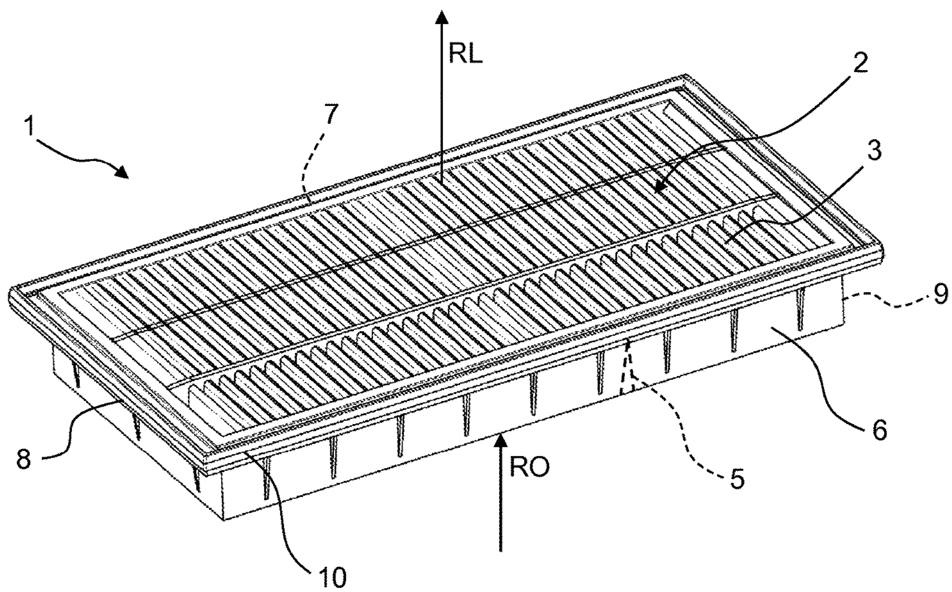
FIG. 1 shows a schematic perspective illustration of an embodiment of an air filter.
Figure 2:
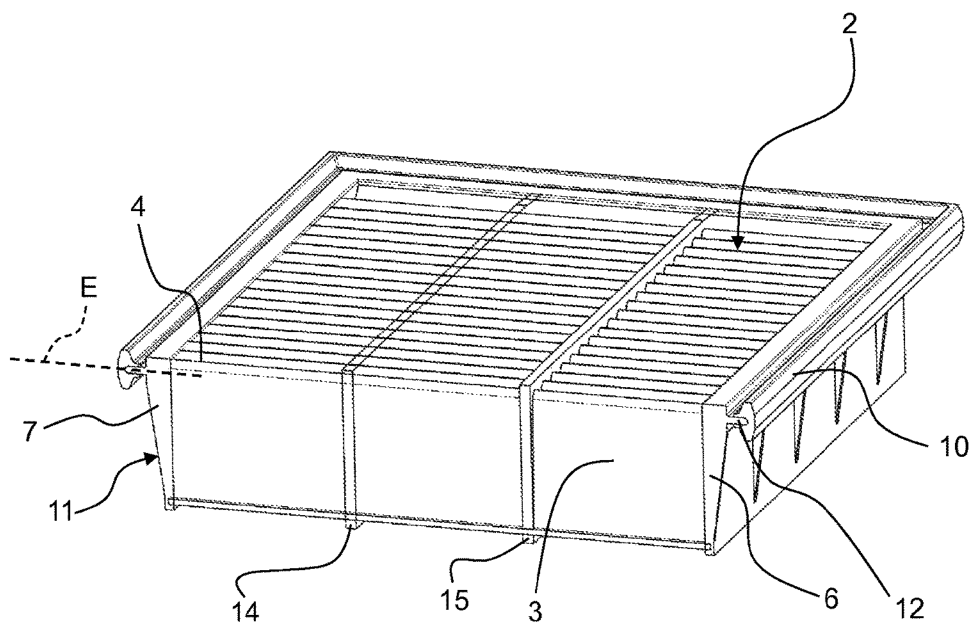
FIG. 2 shows a schematic perspective sectional view of the air filter according to FIG. 1.

FIG. 1 shows a schematic perspective illustration of an exemplary embodiment of an engine intake air filter or air filter 1 for a motor vehicle. FIG. 2 shows a schematic perspective sectional view of the air filter 1. The air filter 1 comprises a filter medium 2 made from pleated filter material. The filter medium 2 is in particular formed as a fold pack or bellows. The filter medium 2 is, for example, a filter fleece, filter fabric, filter mesh or filter felt, in particular a needled felt. The filter medium 2 can be produced in particular by using a meltblown method. The filter medium 2 can include natural fibers, such as cotton, or synthetic fibers made of polyester, polyvinyl sulfate or polytetrafluoroethylene, for example. During processing, fibers of the filter medium 2 can be oriented in a machine direction or can be oriented diagonal thereto and/or transverse thereto. Also, the fibers can be stretched in a spatial direction. The filter medium 2 can be single-layered or multi-layered.

The filter medium 2 can have filter folds 3 which typically extend transverse to the machine direction. The folded filter medium 2 is also referred to as pleating. The filter folds 3 can be generated by means of folding along sharp folded edges 4 (also referred to as fold tips) or by a corrugated embodiment of the filter medium 2. A respective filter fold 3 can be defined by two fold portions which are connected to one another via a corresponding folded edge 4. According to the exemplary embodiment, the folded edges 4 point in and counter to an inflow direction of the air filter 1. The folding can be configured in particular as a zigzag folding.

A frame 11 is extending circumferentially around the filter medium 2. The frame 11 is preferably a monolithic part. The frame 11 comprises side parts 6, 7 which are provided on fold profiles 5 of the filter medium 2 that are illustrated in FIG. 1 with dashed lines. In the orientation of FIG. 1, on each of the longitudinal sides of the filter medium 2 a side part is attached: side part 6 on the front side and side part 7 on the rear side. The side parts 6, 7 provide the air filter 1 with a certain lateral stability.

Furthermore, in order to achieve a stiffening action and a closure on end faces, the frame 11 has head parts 8, 9. The head parts 8, 9 are attached to respective end folds of the filter medium 2. The head parts 8, 9 have a strip-shaped profile. The two side parts 6, 7 together with the head parts 8, 9 enclose the filter medium 2 as a frame 11. In FIG. 2, folded edges 4 of the filter medium 2 are shown on the top side thereof. During operation, for example as an air filter 1, the fluid to be filtered flows through the filter surface which is enlarged by the pleated filter material. Normally, the filter materials and geometries of the filter medium 2 or the air filter 1 are adapted to a predefined flow direction. For example, in FIG. 1, the raw air side RO is shown on the lower side and the filtered clean air side RL is shown on the upper side. In this respect, the upper side is the outflow side and the lower side is the inflow side in the orientation of FIG. 1. As an alternative, the lower side can be the outflow side and the upper side can be the inflow side in the orientation of FIGS. 1 and 2.

The filter medium 2 can function as a particle filter that filters particles, in particular dust, suspended solids or droplets of liquid, out of the intake air. More generally, the filter medium 2 can be adapted to absorb or adsorb certain solid, liquid and/or gaseous substances.

In order to ensure sufficient sealing between the raw air side RO and clean air side RL, a sealing device 10 can be provided between the air filter 1 and a filter housing, which is not illustrated. For example, the sealing device 10 can be integrated in the frame 11 formed by the side parts 6, 7 and the head parts 8, 9.

The sealing device 10 extends in circumferential direction around the filter medium 2 at least partially. The sealing device 10 is made from a foamed thermoplastic elastomer. The frame 11, which at least partially extends circumferentially around the filter medium 2, is preferably injection-molded onto the filter medium 2 by a plastics injection molding method. For example, the frame 11 is made from an ABS material or polyamide which is in particular fiber-reinforced.

The sealing device 10 is in particular injection-molded directly onto the frame 11. For example, the sealing device 10 can be injection-molded onto the frame 11 using a two-component injection molding method. In particular, the frame 11 and the sealing device 10 are injection-molded onto the filter medium 2 in the same plastics injection mold. Due to the foaming of the thermoplastic elastomer, the sealing device 10 comprises a plurality of pores, bubbles or cavities. The pores can be closed or connected to one another. This makes the sealing device 10 very compressible.

The thermoplastic elastomer can be foamed by means of microspheres admixed to the thermoplastic elastomer or by means of a chemical and/or physical foaming method. The elastomer can also be foamed by means of a combined physical/chemical method. The frame 11 preferably has an outwardly projecting web 12 extending at least partially around the filter medium 2 and in a direction away from the filter medium 2. The sealing device 10 engages around the web 12. In particular, the sealing device 10 is injection-molded onto the web 12. The sealing device 10 has a geometry that is mirror-symmetrical with respect to a plane E extending through the web 12. In particular, the sealing device 10 has a rectangular or rhombic cross-sectional geometry. The sealing device 10 is compressible.

As is shown in FIGS. 1 and 2, the air filter 1 has a plurality of folded filter media 2 that are arranged parallel to one another. Separating webs 14, 15 are provided between the bellows-shaped filter media 2. The separating webs 14, 15 are connected to the frame 11. In particular, the separating webs 14, 15 are formed monolithic with the frame 11.

Figure 3:
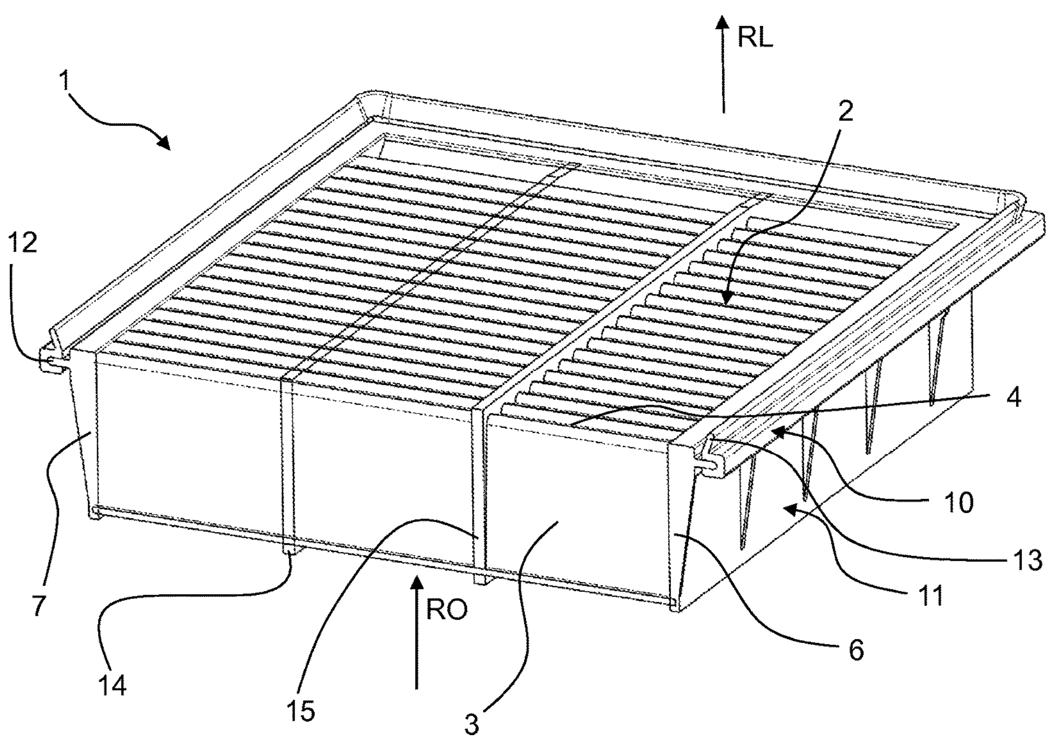
FIG. 3 shows a schematic perspective sectional view of another exemplary embodiment of an air filter.

FIG. 3 shows a schematic perspective cross-sectional view of another embodiment of an air filter 1. The air filter 1 according to FIG. 3 differs from the air filter according to FIGS. 1 and 2 only in that the sealing device 10 has a sealing lip 13 extending around the filter medium 2. The sealing lip 13 is elastically deformable. In particular, the sealing device 10 has a rectangular geometry. From an upper side of the rectangular geometry, the sealing lip 13 extends obliquely away from the filter medium 2.

The sealing device 10 projects laterally from the filter medium 2. This means, the sealing device 10 is arranged substantially perpendicular to the flow direction of the air filter 1. In particular, the sealing device 10 is arranged such that it can be compressed in the axial direction of the air filter 1. In the present case, "axial direction" is to be understood as a direction oriented parallel to the flow direction of the air filter 1. The air filter 1 can be received in a filter housing or a filter receptacle. The sealing device 10 can be compressed or pressed in the flow direction in the filter housing.

Although the present invention has been explained in greater detail based on preferred exemplary embodiments, the invention is not limited thereto, but can be modified in many different ways. In the present case, "a" does not exclude plurality.

While specific embodiments of the invention have been shown and described in detail to illustrate the inventive principles, it will be understood that the invention may be embodied otherwise without departing from such principles.

What is claimed is:

1. A filter element comprising:

a plurality of filter medium;

a sealing device extending at least partially circumferentially around the filter medium, a monolithic one-piece frame that extends at least partially around the filter medium, the frame is glass fiber-reinforced, wherein the filter medium is a folded filter medium having a sequential series of parallel folds proceeding sequentially from a first fold of the filter medium to a last fold, the folds having fold edges that extend across the filter medium from a first lateral side to an opposite second lateral side of the filter medium, the lateral edges of the folds at the first lateral side forming a first fold profile, lateral edges of the folds a the second lateral side forming a second fold profile, wherein the frame has a first side part injection molded directly onto the lateral edges of the filter medium of the first fold profile such that the first fold profile is fixed into the first side part, wherein the frame has an opposite second side part injection molded directly onto the lateral edges of the filter medium of the second fold profile such that the second fold profile is fixed into the second side part, wherein the frame has a head part injection molded directly onto the first fold of the folded filter medium, such that the first fold is fixed directly onto the head part, wherein the folded filter medium is segregated into a plurality of folded filter medium each sharing same fold depths, the plurality of folded filter medium arranged parallel to each other in an interior of the frame, wherein the frame includes at least one separating web monolithic one-piece with the frame, the at least one separating web arranged between and injection molded directly onto the lateral edges of a first one of the plurality of folded filter medium and injection molded onto the lateral edges of an adjacent second one of the plurality of folded filter medium, the at least one separating web support to the plurality of folded filter medium in the interior of the frame, wherein the frame form a radially projecting web, projecting radially outwardly away from a radially outer side of the frame and the filter medium;

wherein the sealing device is comprised of a foamed thermoplastic elastomer and injection-molded onto and having a first portion covering at least one axial side of the radially projecting web, the sealing device forming a sealing lip on a radially inner end of the first portion, the sealing lip projecting axially and radially outwardly away from the radially projecting web at an oblique angle, wherein the thermoplastic elastomer contains microspheres;

wherein the sealing device is elongated, extending in a circumferential direction around the filter element on a plurality of lateral sides of the filter element, wherein in a plane perpendicular to a direction in which the sealing device extends on one of the plurality of lateral sides of the filter element, the sealing device has a rectangular cross-section or a rhombic cross-section.

2. The filter element according to claim 1, wherein the frame is comprised of polypropylene and the sealing device is comprised of a foamed olefin-based thermoplastic elastomer (TPO) or a cross-linked olefin-based thermoplastic elastomer (TPV).

3. The filter element according to claim 1, wherein the frame is comprised of polyamide and the sealing device is comprised of a foamed or a thermoplastic copolyamide (TPA).

4. The filter element according to claim 1, wherein the sealing device is compressible.

5. The filter element according to claim 1, wherein the microspheres cause foaming of the thermoplastic elastomer by chemical foaming; physical foaming; or chemical and physical foaming.

6. The filter element according to claim 1, wherein the thermoplastic elastomer is selected from the group consisting of an olefin-based thermoplastic elastomer (TPO), a cross-linked olefin-based thermoplastic elastomer (TPV), a urethane-based thermoplastic elastomer (TPU), a thermoplastic polyester elastomer or thermoplastic copolyester (TPE-E or TPC), a styrene block copolymer (TPS), and a thermoplastic copolyamide (TPA).

7. A method for producing a filter element, the method comprising:

providing a folded filter medium having a sequential series of parallel folds proceeding sequentially from a first fold of the filter medium to a last fold, the folds having fold edges that extend across the filter medium from a first lateral side to an opposite second lateral side of the filter medium, the lateral edges of the folds at the first lateral side forming a first fold profile, lateral edges of the folds a the second lateral side forming a second fold profile, wherein folded filter medium is segregated into a plurality of folded filter medium each sharing same fold depths, providing a glass-reinforced plastic material for molding a frame;

injection molding the glass-reinforced plastic material directly onto the lateral edges of the filter medium of the first fold profile to form a first side part of the frame, such that the first fold profile is fixed into the first side part, injection molding the glass-reinforced plastic material directly onto the lateral edges of the filter medium of the second fold profile to form a second side part of the frame, such that the second fold profile is fixed into the second side part, injection molding the glass-reinforced plastic material directly onto the first fold of the folded filter medium to form a head part of the frame, such that the first fold of the folded filter medium is fixed into the head part, wherein in the injection molding of the frame, the frame further includes a radially projecting web, projecting radially outwardly away from a radially outer side of the frame, injection molding the glass-reinforced plastic material to form at least one separating web arranged between and connecting lateral edges of the a first and second folded filter medium of the plurality of folded filter medium, injection molding a thermoplastic elastomer containing admixed microspheres onto the frame at least partially circumferentially around an outer circumference of the frame to produce a sealing device comprised of a foamed thermoplastic elastomer at least partially circumferentially around the filter medium, foaming the thermoplastic elastomer of the sealing device, wherein the thermoplastic elastomer is foamed by means of the microspheres causing chemical or physical foaming, wherein in a plane perpendicular to a direction in which the sealing device extends on one of the plurality of lateral sides of the filter element, the sealing device has a rectangular cross-section or a rhombic cross-section, and having a first portion covering at least one axial side of the radially projecting web, wherein the sealing device forms a sealing lip on a radially inner end of the first portion, the sealing lip projecting axially and radially outwardly away from the radially projecting web at an oblique angle.

8. The method according to claim 7, further comprising injection molding the frame and the sealing device in the same injection mold.

* * * * *